Patented Nov. 19, 1929

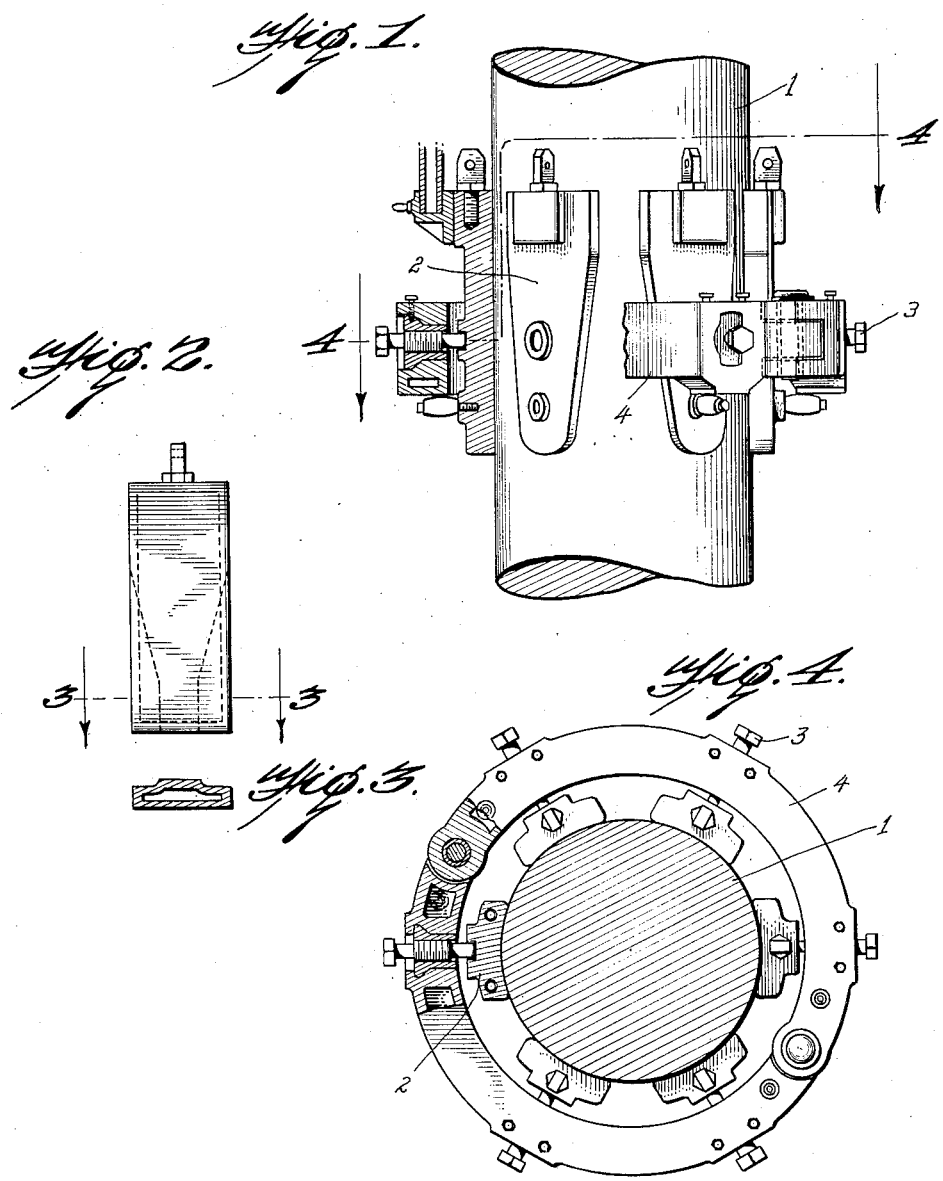

1,735,936

UNITED STATES PATENT OFFICE

MATHIAS OVROM SEM, OF BUFFALO, NEW YORK, AND CARL WILHELM SÖDERBERG, OF OSLO, NORWAY, ASSIGNORS TO DET NORSKE AKTIESELSKAB FOR ELEKTROKEMISK INDUSTRI OF NORWAY, OF OSLO, NORWAY

PROCESS IN THE MANUFACTURE OF ELECTRODES

Application filed August 31, 1927, Serial No. 216,726, and in Norway September 4, 1926.

The present invention relates to electrodes which are baked while in use in the electric furnace and comprise a baked and an unbaked part—the so-called self-baking electrodes. The object of the invention is a process whereby the propagation of the baking process may be regulated. Electrode holders used for open electric furnaces are generally placed on the electrode as close to the top of the furnace charge as advisable, for practical reasons. The baking of the electrode is principally effected by heat from the furnace crater and proceeds upwards in the electrode as this is lowered through the holder to make up for the electrode consumption in the furnace. To protect the electrode holder against the strong heat prevailing above the furnace and against projecting flames it is generally provided with water cooling. The watercooled holder will of course draw considerable amounts of heat and its cooling effect will consequently have a definite influence on the propagation of the electrode baking.

Theretofore in the art, the holders which have been used with this type of electrode, have either been very large, and clamped to a part of the electrode which is soft, (the practice having been to let about 85 to 90% of the electrode surface in the holder region directly contact with the water-cooled metal of the holder), or else, in those electrodes, in which the casing is not provided with ribs, as in U. S. Patent 1,442,031, the holder has been placed on the completely baked part of the electrode.

The first of these prior practices is objectionable in that the upward propagation of the baking is stopped at the lower end of the holder, with the result that the holder is clamped to a part of the electrode which is not sufficiently baked to secure safe suspension of the electrode, nor has sufficiently good conductivity to lead the current from the holder in an economical way.

The practice of placing the holder on completely baked electrode material is objectionable in that in many instances, the holder must not be cooled but must be allowed to "run hot," which is often risky and causes difficulties by reason of the electrode not truly conforming to the shape of the holder.

According to our present invention the disadvantages of the prior practices have been done away with, by providing for the arresting of the baking process at a point in the region of the holder above the lower end of the holder and preferably below the upper end thereof, with the result that the holder will be clamped to a practically completely baked portion of the electrode, and at the same time the baking in the upper portion of the holder region will not have proceeded sufficiently far to prevent the electrode from taking the shape of the holder.

One method of carrying out our process may be attained by the use of a holder illustrated in the drawing and hereinafter described.

In the drawing:—

Figure 1 shows an elevation of an electrode equipped with clamps in accordance with our invention.

Figure 2 is an elevational view of a form of clamp that may be used.

Figure 3 is a section on the line 3—3 of Figure 2.

Figure 4 is a section on the line 4—4 of Figure 1.

Referring more particularly to the drawing, the electrode is indicated at 1, and at 2 is indicated the contact clamps from which the electrode is suspended. The clamps are pressed against the electrodes by means of the screw 3 and the ring 4.

According to our process, the complete water-cooling of the holder parts is retained, while the cooling effect on the electrode is reduced in the lower part of the holder region, by reducing the contact surface between the holder and electrode in the lower part of the holder region, to thereby allow the baking of the electrode to proceed into the holder region before being stopped by the cooling effect of the holder, and at the same time the cooled contact surfaces of the holder are so proportioned as to limit or stop the baking, preferably, in the vicinity of the upper part of the holder, to thereby allow such upper part to give form to the electrode mass. The process is illustrated in the drawing, in which Figure 1 shows the clamps 2 as being tapered toward their lower ends, to thereby reduce the contact surface in the lower portion of the holder region. By experiments we have found that such a reduction of the contact surface may be effected without deforming the electrode permanently. It will be intermediately deformed when started up, but will again assume its normal form as the baking proceeds upwards within the holder and makes the electrode resistant against pressure. When suitably constructed the contact surface may without causing trouble be reduced to 50–75% of the electrode surface in the holder region. To further secure the result it is often suitable to make the contact surface wider in its upper than in its lower part. This also has the advantage that the cooling in the upper part of the holder is then sure to stop the baking before it reaches up through the holder baking the electrode hard above the holder. This is of importance for obtaining a good contact and a safe, controlled slippage of the electrode in the holder when being lowered. A completely baked electrode will often slip badly and with jerks and will not take the shape of the holder as will a non-baked electrode.

By employment of a holder with reduced contact surface as above described the baking is allowed to proceed far enough upwards in the holder to cause the holder to be clamped to a practically completely baked electrode.

If the electrode is lowered short distances at a time (5–15 centimeters) it will stand the lowering without use of the ribs for suspension. The strain on the ribs is consequently reduced to a great extent whereby also the suspension of the electrode becomes safer while at the same time the electrode casing may be simplified in many respects. Thus in many cases the number and size of the ribs may be reduced or they may be simplified or the welded joints may be dispensed with as regards ribs from the various sections or as regards the peripheral part of the casing. The further the cooling effect is reduced the simpler the casing may be made. There is however a limit to such reduction at open furnaces under ordinary conditions and this limit is partly determined by the temperature conditions in the upper part of the charge as it is not desired to run the electrode so hot that it will to any noticeable extent be attacked by air.

On the other hand the contact surface may not be reduced below a certain minimum without causing a poor contact. We have found by experiments that it is usually advantageous to reduce the cooling effect more in the lower than in the upper part of the holder. The advantages hereby are that the electrode is not deleteriously deformed by the holder while at the same time the baking may proceed well upwardly in the holder-region.

As previously mentioned it is generally not desired to let the baking pass all up through the holder as experience has shown that the best results are obtained when the electrode is unbaked inside the upper end of the holder and may there take the shape of the holder while the lower end of the holder is clamped to baked carbon.

The mode of application may of course be varied in many ways. Common to them all is the fact that the propagation of the baking in the electrode is adjusted to the conditions under which the electrode works by employing an electrode holder with a suitable cooling effect, that is a cooling effect which, preferably in the lower part of the holder, is reduced in comparison with the constructions now used. The type of holder herein described may also with advantage be employed in connection with the electrode type described in U. S. Patent No. 1,442,031.

To prevent the electrode from being subject to attack of air below, respectively between the clamps in difficult cases, the clamps may be made in full width all way down to their end, while their contact surface with the electrode is reduced by means of grooves as shown in Fig. 2.

What we claim as new and desire to secure by Letters Patent of the United States is:

1. In the process of baking self-baking electrodes, the step of arresting the baking of the electrode material in the zone of the electrode holder at a point above the lower end of the holder and adjacent the upper end of the holder.

2. In the process of baking self-baking electrodes, the step of arresting the baking of the electrode material in the vicinity of the upper edge of the zone of the electrode holder.

3. In the process of baking self-baking electrodes, the step of arresting, by cooling, the baking of the electrode material at a point in the electrode substantially above the lower edge of the electrode holder region.

4. In the process of baking self-baking electrodes, the step of cooling the electrode in the region of the electrode holder to an extent sufficient to arrest the baking of the electrode material before such baking reaches the top of the electrode holder and after it has passed the bottom of the electrode holder.

5. In the process of baking self-baking electrodes, the step of cooling the electrode in the region of the electrode holder to an extent sufficient to arrest the baking of the electrode material in the vicinity of the upper edge of the region of the electrode holder.

6. In the process of baking self-baking electrodes, the step of gradually cooling the electrode to an increasing extent as the upper part of the region of the electrode holder is approached to thereby arrest the baking of the electrode material in the vicinity of the upper edge of the electrode holder region.

7. The combination with an electrode baked while in use in the electric furnace, of an electrode holder including water-cooled contact clamps having cooling surfaces contacting with the electrode, such cooling surfaces decreasing in area toward the lower portion of the holder.

8. The combination with an electrode baked while in use in the electric furnace, of an electrode holder including contact clamps having cooling surfaces contacting with such electrode, the area of the cooling surfaces being greater at the upper portion of the electrode holder than at the lower portion thereof.

9. The combination with an electrode baked while in use in the electric furnace, of an electrode holder having surfaces contacting with the electrode, the total area of the contacting surfaces being from approximately 50 to 75% of the surface area of the electrode in the region of the electrode holder.

10. The combination with an electrode baked while in use in the electric furnace, of a fluid cooled electrode holder including surfaces contacting with the electrode, such surfaces not exceeding substantially 75% of the surface area of the electrode in the region of the electrode holder.

11. The combination with an electrode baked while in use in the electric furnace, of a fluid cooled electrode holder including contact clamps having cooling surfaces which engage the electrode and which taper and decrease in area in the direction from which the baking heat is propagated.

CARL WILHELM SÖDERBERG.
MATHIAS OVROM SEM.